Figure 2:
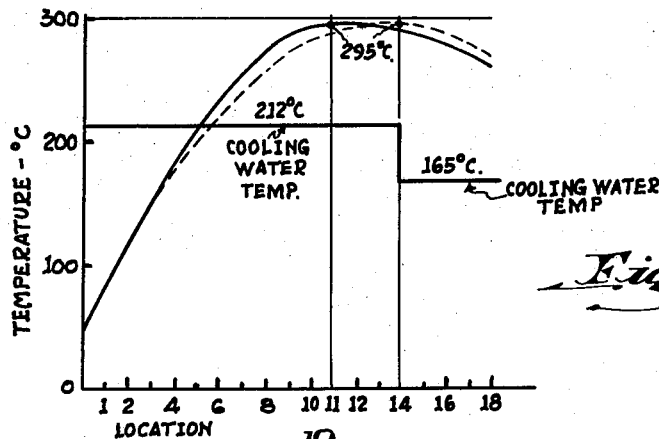

Feb. 27, 1962

H. M. SCHAPPERT 3,023,202

ETHYLENE POLYMERIZATION

Filed Jan. 22, 1960

2 Sheets-Sheet 1

INVENTOR.
HANS M. SCHAPPERT.
BY Oscar B. Brumback.
his ATTORNEY.

Feb. 27, 1962 H. M. SCHAPPERT 3,023,202
ETHYLENE POLYMERIZATION
Filed Jan. 22, 1960 2 Sheets-Sheet 2

INVENTOR.
Hans M. Schappert.
BY
Oscar B. Brumback.
his ATTORNEY.

United States Patent Office 3,023,202
Patented Feb. 27, 1962

---

3,023,202
ETHYLENE POLYMERIZATION
Hans M. Schappert, Bethel Park, Pa., assignor to Koppers Company, Inc., a corporation of Delaware
Filed Jan. 22, 1960, Ser. No. 4,059
6 Claims. (Cl. 260—94.9)

This invention relates generally to the polymerization of ethylene at high pressures.

In the continuous polymerization of ethylene to a normally solid polyethylene, the ethylene and a small amount of free radical yielding catalyst such as oxygen, peroxide such as ditertiary butyl peroxide, or an azo compound are introduced into a reaction zone where the polymerization takes place at a pressure of 17,000 to 40,000 pounds per square foot. The output from this zone is released periodically into a catch pot. This output is a mixture of ethylene and polyethylene since only about ten to sixteen percent of the ethylene passing through the reaction chamber is converted to polymer during any one passage of the ethylene therethrough. The ethylene is separated from the polyethylene in the catch pot, and the ethylene, which is now oxygen-free, is combined with fresh ethylene containing the catalyst and the admixture fed into the reactor.

The flow of unreacted ethylene from the catch pot is continuous, but the rate of flow is not at a constant rate because of the change in pressure when the output of the reaction zone is released to the catch pot. This variation in the flow of unreacted ethylene which is combined with the fresh oxygen-containing ethylene for the feed to the reactor causes a corresponding fluctuation in the concentration of the ethylene feed to the reactor. Additionally, the ethylene at these high pressures behaves in a manner similar to a liquid so that only a small amount of mixing takes place as the ethylene catalyst mixture flows to the reactor, thereby enhancing variations in catalyst concentration. Thus, the catalyst concentration to the reactor varies in a cyclical manner, the oxygen concentration reaching a crest or peak as the rate of flow of unreacted ethylene from the catch pot is at a minimum and reaching a trough or valley when the rate of flow of unreacted ethylene from the catch pot is at a maximum. Since the reactor is periodically released to the catch pot, these crests and troughs are cyclic. Therefore, due to the cyclical rate of addition of unreacted ethylene to the incoming ethylene and oxygen, the catalyst concentration during a period of the cycle undergoes wide variations even though the average concentration during this period remains constant. Furthermore, since ethylene under high pressure behaves in a manner similar to a liquid whose density is about 0.6, the amount of mixing of the ethylene-catalyst mixture is small, thereby enhancing the variation in catalyst concentration.

Although a comparatively small amount of catalyst (25–60 parts of oxygen, for example, per million parts of ethylene) is used in the polymerization process, slight differences in the catalyst concentration within this narrow range effect substantial changes in the molecular weight of resulting polymer and in the rate of polymerization of ethylene. In general, the higher the concentration of catalyst in the ethylene, the higher will be the molecular weight in the resulting polymer; and the higher the catalyst concentration, the lower will be the temperature at which polymerization occurs.

An object of this invention is to improve the distribution of oxygen-catalyst in the ethylene feed stream entering the polymerization reactor, thereby enabling the production of a polymer of ethylene having a substantially uniform molecular weight distribution.

In accordance with this invention, the process of subjecting ethylene to high pressures in the presence of a free-radical-yielding catalyst in a reaction zone so that a portion of the ethylene polymerizes to solid polymer, periodically removing material from the reaction zone and separating the unreacted ethylene from the polymer, and releasing the unreacted ethylene to the reaction zone where such recycling results in the instantaneous concentration of the feed to the reactor varying although the average composition over a period of time remains unchanged, is improved by dividing the feed to the reactor into a plurality of streams and combining the stream which has been obtained at one instant with the stream which has been obtained at another instant, whereby the instantaneous composition of the combined streams is maintained more uniform with respect to said average composition.

In accordance with this invention, the improvement of this invention can advantageously be obtained by dividing the feed gas into a plurality of streams and delaying the combination of one stream relative to the other stream. Conveniently this is accomplished by placing in the feed line a plurality of ducts that are joined at their ends, but are of varying lengths.

The polymerization of the ethylene does not take place at an appreciable rate until the ethylene reaches a temperature of 150° C. to 180° C. Thereafter, the reaction proceeds exothermically and with great rapidity if it is not controlled. To prevent decomposition, heat is extracted from the reaction zone so that the temperature does not exceed 300° C. The oxygen concentration has been found to determine the rate and temperature of the polymerization.

In accordance with this invention, it is possible to change the position where the maximum temperature (known as the "hot spot") is reached in the reactor. The effect of the peaks of oxygen concentration is to initiate the polymerization at an early stage in the reactor. Controlling these peaks, therefore, in accordance with this invention permits the ethylene to travel further through the reactor before polymerization is initiated and the location of the hot spot in the reactor can be positioned toward and away from the input end of the reactor. This positioning of the hot spot in the reactor permits a wider range in the more advantageous use of cooling fluid in that the temperature difference can be varied to obtain the desired amount of cooling of the reacting mass.

The above and further objects and novel features of the invention will appear more fully from the following detailed description when the same is read in connection with the accompanying drawings. It is to be expressly understood, however, that the drawings are not intended as a definition of the invention, but are for the purpose of illustration only.

Figure 1:
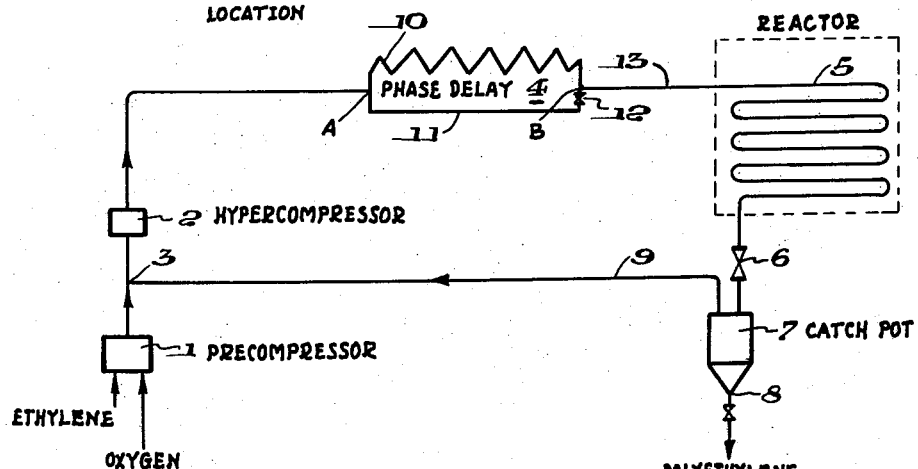
Figure 3:
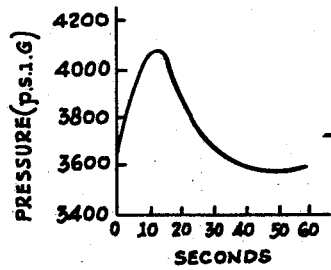
Figure 4:
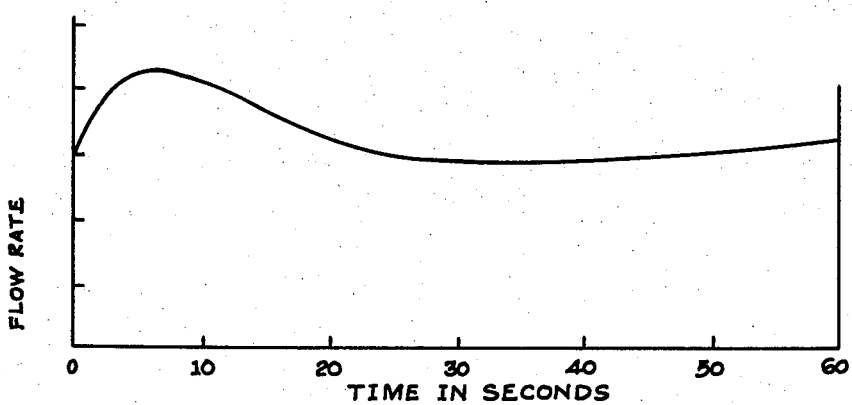
Figure 5:
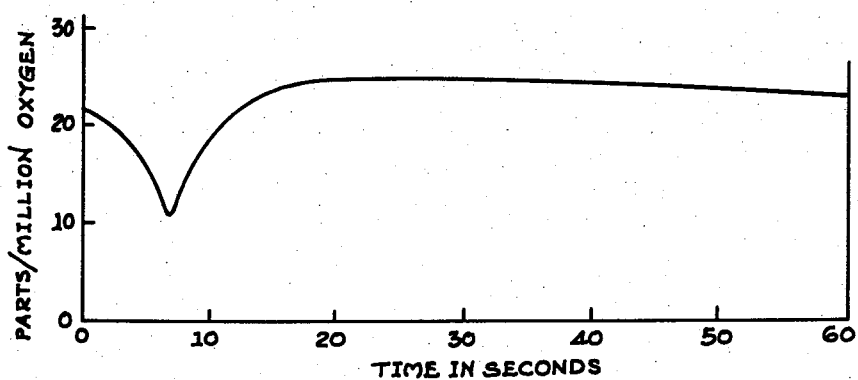
Figure 6:
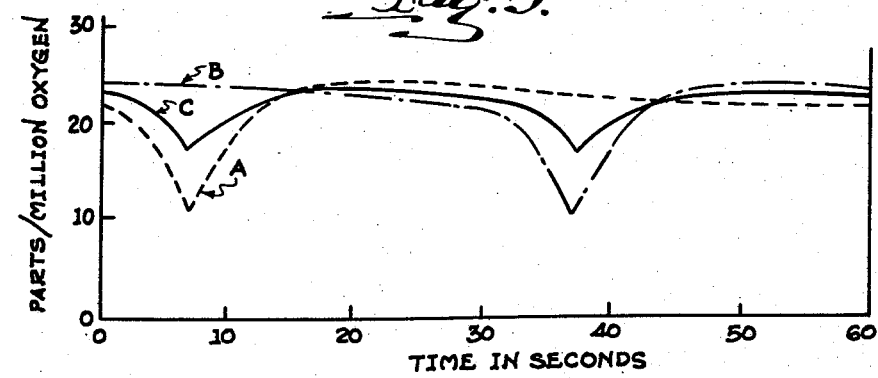

In the drawings wherein like parts are marked alike:
FIGURE 1 is a schematic illustration of an embodiment of the invention;
FIGURE 2 illustrates the shifting of the location of the point of maximum temperature in the reactor of FIGURE 1;
FIGURE 3 illustrates the variation in pressure in line 9 of FIGURE 1;
FIGURE 4 illustrates the variation in the rate of flow of ethylene during the pressure variation period of FIGURE 1;
FIGURE 5 illustrates the fluctuation in catalyst concentration in ethylene feed resulting from the variations shown in FIGURES 3 and 4;
FIGURE 6 illustrates the variations in the feed composition in lines 10, 11 and 13 of FIGURE 1.

Turning now to FIGURE 1, fresh ethylene containing a predetermined amount of catalyst is fed into the pre-compressor 1 which compresses the mixture to a pressure of from 1500 to 3600 pounds per square inch. To this compressed mixture is added at 3 any unreacted ethylene (which is catalyst free) from a previous pass of ethylene through the reactor 5. A hyper-compressor 2 compresses the combined ethylene and catalyst to a pressure of between 17,000 and 40,000 pounds per square inch. The compressed ethylene and catalyst then flow into a water cooled reactor 5 where from ten to eighteen percent of the ethylene is converted to polymer. A mixture of polymer and unreacted ethylene is released from the reactor at regular intervals, usually at intervals of about one minute, through a valve 6 into the catch pot 7 which is also under pressure. The polymer and gases are separated in the catch pot. The polymer is withdrawn from the catch pot at 8, and the unreacted ethylene, which is catalyst-free, is returned to reactor 5 by way of duct 9 and is combined at 3 with the fresh ethylene and catalyst feed.

The release at 6 of unreacted ethylene from the reactor at regular intervals causes the pressure in catch pot 7 to undergo a correspondingly regular fluctuation. Although the flow of unreacted ethylene through line 9 to be combined at 3 with the fresh catalyst containing ethylene is continuous, the rate of flow varies through a regular cycle because of the regular variation in pressure in catch pot 7.

This variation in rate of flow ultimately results in a rhythmical veriation in the rate at which the catalyst in the fresh ethylene is diluted as it is combined with the unreacted catalyst-free ethylene. Thus, while the concentration of catalyst in the ethylene, when averaged over a period of time, may be the desired concentration, a small proportion only of this feed stream will actually contain this concentration of catalyst and a large proportion of the feed stream will contain either more or less than the average concentration.

The equipment as aforedescribed is conventional and results in this peaking of catalyst concentration, which peaking, in general, is undesirable. In accordance with this invention, the peaking is controlled by the incorporation of a phase delay device 4 into the feed duct between the hyper-compressor 2 and the reactor 5 to obtain a more even and regular distribution of catalyst in the feed to the reactor.

Phase delay device 4 as illustrated in FIGURE 1 comprises two parallel ducts 10 and 11 joined at each end A and B. Duct 10 is longer than duct 11. Phase delay device 4 thus divides the feed gas flowing from the hyper-compressor 3 to reactor 5 into two streams flowing through ducts 10 and 11. While the quantities passing through each of these ducts should advantageously be about equal, some variation is possible as will be shown later. A valve 12 may be incorporated into the shorter duct 11 so as to be partially closed to compensate for the lesser flow resistance in this shorter duct and maintain the desired relative flows in the ducts. The relationship of the flows may be determined in a simple manner by placing identical jackets of equal length around part of each of the two ducts 10 and 11 and then introducing water of equal temperature into each of the two jackets at the same flow rate. If the water flowing out of each of the two jackets has the same temperature, the rate of flow of catalyst containing ethylene in each of the ducts is the same; but if a difference exists between the temperatures of the water leaving the jackets the ethylene and catalyst is flowing at a greater rate in the line whose exit jacket water temperature is higher. By use of valve 12, the ethylene feed flow in each of the two tubes can be conveniently regulated so that the temperature of the cooling water leaving the two jackets will be the same.

In carrying out the novel process for producing improved polyethylene in apparatus such as illustrated in FIGURE 1, oxygen at a throughput of 1.7 cubic feet per hour in ethylene monomer at a throughput of 1800 pounds per hour was fed into the pre-compressor 1 and compressed to a pressure of about 3600 pounds per square inch. The compressed-ethylene-oxygen mixture was then combined at 3 with oxygen-free unreacted ethylene from the catch pot 7 (the instantaneous flow rate of this unreacted ethylene varied between 4200 and 4700 pounds per hour, during a 60 second cycle. The resulting mixture having an average oxygen-catalyst concentration of 40 parts per million was further compressed to a pressure of about 22,000 pounds per square inch by the hyper-compressor 2 and introduced into the novel phase delay device 4 at a throughput of 6000–6500 pounds per hour. Phase delay device 4 divided the mixture into two streams, flowing through ducts 10 and 11. The two streams were combined at junction B before entering the reactor 5 where a portion of the ethylene was polymerized. By way of valve 6, a mixture of polymer and unreacted ethylene was released from reactor 5 at one minute intervals into catch pot 7. The ethylene was separated from the polymer in catch pot 7. The ethylene was returned by way of line 9 to be combined at 3 with fresh oxygen-containing ethylene while the polymer was released at 8 through the bottom of the catch pot.

The regular release of the mixture of polymer and unreacted ethylene from reactor 5 caused the pressure in catch pot 7 to fluctuate between 3580 and 4100 pounds per square inch in a manner that is demonstrated graphically in FIGURE 3. This regular pressure fluctuation caused a corresponding fluctuation in the flow of unreacted recycled ethylene as it combined with fresh ethylene at 3 and caused a resultant fluctuation in oxygen-catalyst concentration in the ethylene feed to hyper-compressor 2. FIGURE 4 graphically illustrates the fluctuations in rate of flow of the ethylene in line 9 over a one-minute interval whose pressure is shown in FIGURE 3 and FIGURE 5 shows the change in oxygen concentration at junction A during this period. Although the average oxygen-concentration during this time was 20 parts per million, the oxygen concentration at the end of the first seven seconds had reached a low of 10 parts per million. These changes in catalyst concentration heretofore have caused the product polymer to vary greatly in molecular weight range.

FIGURE 6 demonstrates the effect of the novel phase delay device on the oxygen concentration in the ethylene feed. Curve A represents the concentration of oxygen catalyst in the ethylene contained in duct 11 over a measured period of one minute at points just prior to the two streams combining at junction B, curve B represents the oxygen concentration in duct 10 during this period and curve C represents the oxygen concentration measured at a point between B and reactor 5 during this period. Curve C, which is resultant of curves A and B, shows that the oxygen concentration did not fluctuate more than 6 parts per million during the 60 second cycle.

Because of the shape of the original oxygen concentration curve as shown in FIGURE 5, it matters little if the oxygen containing ethylene stream is not exactly evenly divided in the phase delay device. The volume in either duct may vary between 45 percent and 55 percent.

When the phase delay device is set such that 50 percent of the ethylene will flow through each of the two ducts during a 60 second cycle, this same setting will operate effectively for any other length of cycles. Thus, in a 60 second cycle, the flow in duct 10 is delayed by thirty seconds but in the case of 45 second cycle, the flow in duct 10 would be delayed 22.5 seconds.

When carrying out the process in a system illustrated in FIGURE 1, valve 12 was closed. A feed of 6000 pounds per hour ethylene of 99.9 percent purity at a pressure of 2100 pounds p.s.i.g. was charged to the reactor. This feed gas was comprised of 1900 pounds of fresh ethylene from the precompressor and 4100 pounds of unreacted ethylene from line 9. Gaseous oxygen was admitted to the first stage of the precompressor at the rate of 2.2 standard cubic feet per hour so as to provide an average concentration of 26 parts of oxygen per million parts of ethylene at the inlet to reactor 5. The temperatures are measured at eighteen equally spaced locations along the reactor by means of thermocouple. As shown in FIGURE 2, the temperature along the length of the reactor increased to a hot spot of 295° C. at location 11 and then decreased to 248° C. at location 18. Material from the reactor was released to the catch pot every 54 seconds, the pressure being released by means of a valve from 21,600 p.s.i.g. to 16,000 p.s.i.g. for one second and being restored during the following 12 seconds by the continuously operating hyper-compressor. The hourly production rate was 740 pounds of polyethylene having a melt index of 2.0.

While operating under the conditions described above, the value for line 11 of the phase delay device 4 was opened to such an extent that about 40 percent of the total feed flowed through the line 11. The hot spot moved from location 11 to location 14. Since more heat was removed in the tubes up to location 14 than in the previous operation, temperature at the hot spot decreased from 295° C. to 288° C. This temperature of 288° C. permitted the pressure to be increased to 22,000 pounds per square inch to reach a temperature of 295° C. again. At the higher pressure, a greater amount of ethylene was being passed through the reactor so the oxygen addition was increased to 2.2 standard cubic feet. Under these conditions, a production rate of 790 pounds per hour of polyethylene having melt index 2.0 was obtained.

While the foregoing has illustrated the use of two streams in carrying out the invention, it should be recognized that more than two streams may be used.

I claim:

1. In a process for polymerizing ethylene which comprises flowing through a polymerization reactor at high pressures and temperatures a mixture of (1) fresh ethylene to which a normally gaseous free radical yielding ethylene polymerization catalyst has been added and (2) recycle ethylene, previously passed through said polymerization reactor, in which the catalyst has been consumed by polymerizing a portion of said ethylene to solid polyethylene, said solid polyethylene having been separated and the unpolymerized ethylene and said polyethylene having been periodically released from said polymerization reactor so that when said recycle ethylene is mixed with said fresh ethylene to which a normally gaseous free radical yielding ethylene polymerization catalyst has been added, said mixture contains catalyst rich increments and catalyst poor increments, the improvement comprising: dividing said mixture into a plurality of streams and combining said streams so that a catalyst rich increment of one stream is combined with a catalyst poor increment of another stream prior to the conversion of any of said mixture to polyethylene to thereby obtain in said mixture a more uniform distribution of said normally gaseous free radical yielding catalyst.

2. In a process for polymerizing ethylene which comprises flowing through a polymerization reactor at high pressures and temperatures a mixture of (1) fresh ethylene to which a free radical yielding ethylene polymerization catalyst has been added and (2) recycle ethylene, previously passed through said polymerization reactor, in which the catalyst has been consumed by polymerizing a portion of said ethylene to solid polyethylene, said solid polyethylene having been separated and the unpolymerized ethylene and said polyethylene having been periodically released from said polymerization reactor so that when said recycle ethylene is mixed with said fresh ethylene to which a free radical yielding ethylene polymerization catalyst has been added, said mixture contains catalyst rich increments and catalyst poor increments, the improvement comprising: dividing said mixture into a plurality of streams and combining said streams so that a catalyst rich increment of one stream is combined with a catalyst poor increment of another stream prior to the conversion of any of said mixture to polyethylene to thereby obtain in said mixture a more uniform distribution of said free radical yielding catalyst.

3. In a process for polymerizing ethylene which comprises flowing through a polymerization reactor at high pressures and temperatures a mixture of (1) fresh ethylene to which catalytic amounts of oxygen have been added and (2) recycle ethylene, previously passed through said polymerization reactor, in which said oxygen has been consumed by polymerizing a portion of said ethylene to solid polyethylene, said solid polyethylene having been separated and the unpolymerized ethylene and said polyethylene having been periodically released from said polymerization reactor so that when said recycle ethylene is mixed with said fresh ethylene to which a catalytic amount of oxygen has been added, said mixture contains oxygen rich increments and oxygen poor increments, the improvement comprising: dividing said mixture into two streams and combining said streams so that an oxygen rich increment of one stream is combined with an oxygen poor increment of the other stream prior to the conversion of any of said mixture to polyethylene to thereby obtain in said mixture a more uniform distribution of said oxygen.

4. In a process for polymerizing ethylene which comprises flowing through a polymerization reactor at high pressures and temperatures a mixture of (1) fresh ethylene to which a catalytic amount of oxygen has been added and (2) recycle ethylene, previously passed through said polymerization reactor, in which said oxygen has been consumed by polymerizing a portion of said ethylene to solid polyethylene, said solid polyethylene having been separated and the unpolymerized ethylene and said polyethylene having been periodically released from said polymerization reactor so that when said recycle ethylene is mixed with said fresh ethylene to which a catalytic amount of oxygen has been added, said mixture contains oxygen rich increments and oxygen poor increments, the improvement comprising: dividing said mixture into two streams of such varying lengths that upon combining said streams an oxygen rich increment of one stream is combined with an oxygen poor increment of the other stream prior to the conversion of any of said mixture to polyethylene to thereby obtain in said mixture a more uniform distribution of said oxygen.

5. An apparatus for the polymerization of ethylene at high temperatures and pressures consisting of a first compressor which compresses a mixture of fresh ethylene and a free radical yielding catalyst to pressures of from 1500 to 3600 pounds per square inch, a first conduit connecting the outlet end of said first compressor with the inlet end of a second compressor and which is connected intermediate said first and second compressors to the outlet end of a second conduit through which catalyst-free unreacted ethylene which has previously passed through the polymerization reactor is fed, so that there results in said first conduit alternate catalyst rich and catalyst poor increments of ethylene, said second compressor being capable of compressing the fresh ethylene-free oxygen yielding catalyst and recycled ethylene mixture to pressures of between 17,000 and 40,000 pounds per square inch, the outlet end of said second compressor being connected to the inlet end of a feed conduit, the outlet end of said feed conduit being connected to the inlet end of said second compressor, a long tube polymerization reactor, the outlet end of said reactor having a valve which periodically opens and closes to admit a mixture of polyethylene and unreacted ethylene to a catchpot wherein said polyethylene and said ethylene are separated, valve means in said catchpot for releasing the separated polyethylene and a second conduit connecting said catchpot with said first conduit, the improvement comprising dual ducts connected at both ends to said feed conduit, intermediate said second compressor and said reactor, one of said dual ducts being longer than the other of said dual ducts whereby ethylene flowing through one of said dual ducts is delayed so that a catalyst rich increment is mixed with a catalyst poor increment.

6. An apparatus for the polymerization of ethylene at high temperatures and pressures consisting of a first compressor which compresses a mixture of fresh ethylene and a free radical yielding catalyst to pressures of from 1500 to 3600 pounds per square inch, a first conduit connecting the outlet end of said first compressor with the inlet end of a second compressor and which is connected intermediate said first and second compressors to the outlet end of a second conduit through which catalyst-free unreacted ethylene which has previously passed through the polymerization reactor is fed, so that there results in said first conduit alternate catalyst rich and catalyst poor increments of ethylene, said second compressor being capable of compressing the fresh ethylene-free oxygen yielding catalyst and recycled ethylene mixture to pressures of between 17,000 and 40,000 pounds per square inch, the outlet end of said second compressor being connected to the inlet end of a feed conduit, the outlet end of said feed conduit being connected to the inlet end of said second compressor, a long tube polymerization reactor, the outlet end of said reactor end a valve which periodically opens and closes to admit the mixture of polyethylene and unreacted ethylene to a catchpot wherein said polyethylene and said ethylene are separated, valve means in said catchpot for releasing the separated polyethylene, a second conduit connecting said catchpot with said first conduit, and dual ducts connected at both ends to said feed conduit intermediate said second compressor and said reactor, one of said dual ducts being longer than the other of said dual ducts whereby ethylene flowing through said other dual duct is delayed so that a catalyst rich increment is mixed with a catalyst poor increment.

References Cited in the file of this patent

UNITED STATES PATENTS

| | | |
|---|---|---|
| 1,767,588 | Hutton | June 24, 1930 |
| 2,630,820 | Gray | Mar. 10, 1953 |
| 2,852,501 | Richard et al. | Sept. 16, 1958 |
| 2,908,734 | Cottle | Oct. 13, 1959 |